United States Patent
Slavens et al.

(10) Patent No.: US 10,329,918 B2
(45) Date of Patent: Jun. 25, 2019

(54) MULTIPLE PIECE ENGINE COMPONENT

(71) Applicant: UNITED TECHNOLOGIES CORPORATION, Farmington, CT (US)

(72) Inventors: Thomas N. Slavens, Vernon, CT (US); Mark F. Zelesky, Bolton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 468 days.

(21) Appl. No.: 15/030,243

(22) PCT Filed: Oct. 17, 2014

(86) PCT No.: PCT/US2014/061061
§ 371 (c)(1),
(2) Date: Apr. 18, 2016

(87) PCT Pub. No.: WO2015/058043
PCT Pub. Date: Apr. 23, 2015

(65) Prior Publication Data
US 2016/0265362 A1 Sep. 15, 2016

Related U.S. Application Data

(60) Provisional application No. 61/892,763, filed on Oct. 18, 2013.

(51) Int. Cl.
*F01D 5/14* (2006.01)
*B22F 5/04* (2006.01)
(Continued)

(52) U.S. Cl.
CPC ............... *F01D 5/147* (2013.01); *B21K 3/04* (2013.01); *B22D 21/005* (2013.01); *B22D 25/02* (2013.01);
(Continued)

(58) Field of Classification Search
CPC ....... F01D 5/147; F01D 5/188; B23K 26/342; B23K 26/0006; B23K 26/34;
(Continued)

(56) References Cited

U.S. PATENT DOCUMENTS 4,519,745 A * 5/1985 Rosman .................. F01D 5/284
416/241 B
5,425,622 A 6/1995 Murray et al.
(Continued)

FOREIGN PATENT DOCUMENTS

DE 102009048665 A1 3/2011
EP 1596036 A1 11/2005
(Continued)

OTHER PUBLICATIONS

European Search Report for European Patent Application No. 14853886.1, completed Feb. 7, 2017.

*Primary Examiner* — Moshe Wilensky
(74) *Attorney, Agent, or Firm* — Carlson, Gaskey & Olds, P.C.

(57) ABSTRACT

One exemplary embodiment of this disclosure relates to a gas turbine engine, including a component having a first portion formed using one of a casting and a forging process, and a second portion formed using an additive manufacturing process.

13 Claims, 7 Drawing Sheets

(51) Int. Cl.
| | |
|---|---|
| *F01D 5/18* | (2006.01) |
| *B22F 3/105* | (2006.01) |
| *B22F 7/08* | (2006.01) |
| *B23K 1/00* | (2006.01) |
| *B23K 15/00* | (2006.01) |
| *B23K 26/34* | (2014.01) |
| *B23K 31/02* | (2006.01) |
| *B23K 26/342* | (2014.01) |
| *B21K 3/04* | (2006.01) |
| *B22D 21/00* | (2006.01) |
| *B22D 25/02* | (2006.01) |
| *B22F 3/24* | (2006.01) |
| *B23K 10/02* | (2006.01) |
| *B23K 26/00* | (2014.01) |
| *B23K 101/00* | (2006.01) |
| *B23K 103/04* | (2006.01) |
| *B23K 103/08* | (2006.01) |
| *B23K 103/14* | (2006.01) |
| *B23K 103/16* | (2006.01) |
| *B33Y 10/00* | (2015.01) |
| *B33Y 80/00* | (2015.01) |

(52) U.S. Cl.
CPC .............. *B22F 3/1055* (2013.01); *B22F 3/24* (2013.01); *B22F 5/04* (2013.01); *B22F 7/08* (2013.01); *B23K 1/0018* (2013.01); *B23K 10/027* (2013.01); *B23K 15/0086* (2013.01); *B23K 15/0093* (2013.01); *B23K 26/0006* (2013.01); *B23K 26/34* (2013.01); *B23K 26/342* (2015.10); *B23K 31/02* (2013.01); *F01D 5/188* (2013.01); *B22F 2301/15* (2013.01); *B22F 2301/20* (2013.01); *B22F 2301/205* (2013.01); *B22F 2301/35* (2013.01); *B22F 2998/10* (2013.01); *B23K 2101/001* (2018.08); *B23K 2103/04* (2018.08); *B23K 2103/08* (2018.08); *B23K 2103/14* (2018.08); *B23K 2103/16* (2018.08); *B33Y 10/00* (2014.12); *B33Y 80/00* (2014.12); *F05D 2300/607* (2013.01); *Y02P 10/295* (2015.11)

(58) Field of Classification Search
CPC .. B23K 10/027; B23K 1/00018; B23K 31/02; B23K 1/0018; B23K 15/0093; B23K 15/0086; B22D 25/02; B22D 21/005; B22F 3/24; B22F 3/1055; B22F 7/08; B22F 5/04; B21K 3/04
See application file for complete search history.

(56) References Cited

U.S. PATENT DOCUMENTS

| | | | |
|---|---|---|---|
| 2005/0244273 | A1 | 11/2005 | Parisi et al. |
| 2007/0163114 | A1 | 7/2007 | Johnson |
| 2008/0310965 | A1* | 12/2008 | Gerakis .................. F01D 5/147 416/97 R |
| 2011/0097213 | A1 | 4/2011 | Peretti et al. |
| 2011/0142684 | A1 | 6/2011 | Campbell et al. |
| 2011/0311389 | A1 | 12/2011 | Ryan et al. |
| 2012/0034101 | A1 | 2/2012 | James et al. |
| 2012/0156054 | A1 | 6/2012 | Lacy et al. |
| 2012/0201691 | A1 | 8/2012 | Dautl et al. |
| 2012/0222306 | A1 | 9/2012 | Mittendorf et al. |
| 2013/0081774 | A1 | 4/2013 | Mueller et al. |
| 2014/0169981 | A1* | 6/2014 | Bales ....................... B22F 5/04 416/96 R |

FOREIGN PATENT DOCUMENTS

| | | |
|---|---|---|
| EP | 1227905 B1 | 3/2007 |
| EP | 2500263 A2 | 9/2012 |
| JP | 2009074545 A | 4/2009 |

* cited by examiner

MULTIPLE PIECE ENGINE COMPONENT

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into the core flow path of the gas turbine engine. For example, in the turbine section, turbine blades rotate and extract energy from the hot combustion gases that are communicated along the core flow path of the gas turbine engine. Turbine blades are known to include an airfoil section, over which the hot combustion gases flow, and a root attached to a rotatable disc. Turbine blades are typically cast such that the airfoil section and the root are integrally formed as a single-piece structure.

SUMMARY

One exemplary embodiment of this disclosure relates to a gas turbine engine, including a component having a first portion formed using one of a casting and a forging process, and a second portion formed using an additive manufacturing process.

In a further embodiment of any of the above, the component includes a third portion formed using an additive manufacturing process.

In a further embodiment of any of the above, the second portion and the third portion provide pressure and suction side walls of the component.

In a further embodiment of any of the above, the first portion includes a root, platform, and at least one radial support projecting from the platform.

In a further embodiment of any of the above, the root, platform, and at least one radial support are integrally formed of one of a single crystal, directionally solidified, and an equiax alloy.

In a further embodiment of any of the above, the at least one radial support includes at least one rib projecting into a corresponding slot formed in one of the second portion and the third portion.

In a further embodiment of any of the above, the at least one radial support includes a plurality of radial supports, each of the radial supports including a first rib and a second rib projecting into slots formed in the second portion and the third portion.

In a further embodiment of any of the above, the at least one radial support provides a mate face corresponding to a mate face of one of the second portion and the third portion.

In a further embodiment of any of the above, the second portion and the third portion are joined to the at least one radial support by one of welding, brazing, diffusion bonding, and gluing.

In a further embodiment of any of the above, the second portion and the third portion include microchannels formed therein.

In a further embodiment of any of the above, the component is one of a rotor blade and a stator vane.

Another exemplary embodiment of this disclosure relates to a component for a gas turbine engine. The component includes a platform, and an airfoil section including a pressure side wall and a suction side wall. The platform is formed using one of a casting and a forging process, and the pressure and suction side walls are formed using an additive manufacturing process.

In a further embodiment of any of the above, the component includes at least one radial support projecting from the platform, the at least one radial support formed integrally with the platform during the casting process.

In a further embodiment of any of the above, the at least one radial support provides a joining interface with one of the pressure side wall and the suction side wall.

In a further embodiment of any of the above, the at least one radial support includes a rib projecting into a corresponding slot in one of the pressure side wall and the suction side wall.

Another exemplary embodiment of this disclosure relates to a method of forming a component. The method includes forming a first portion of the component using one of a casting and a forging process, additively manufacturing a second portion of the component, and joining the second portion to the first portion.

In a further embodiment of any of the above, the method includes additively manufacturing a third portion of the component, and joining the third portion to the first portion.

In a further embodiment of any of the above, the joining step includes one of welding, brazing, and gluing.

In a further embodiment of any of the above, the additive manufacturing step includes one of a direct metal laser sintering (DMLS) process, an electron beam melting (EBM) process, electron beam wire deposition (EBWD) process, a laser powder deposition (LPD) process, and a laser powder plasma spray (LPPS) process.

In a further embodiment of any of the above, the additive manufacturing step includes selectively melting a powdered metal, and the powdered metal is one of (1) a titanium alloy, (2) tungsten alloy, (3) nickel alloy, (4) cobalt alloy, (5) steel alloy, and (6) a molybdenum alloy.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
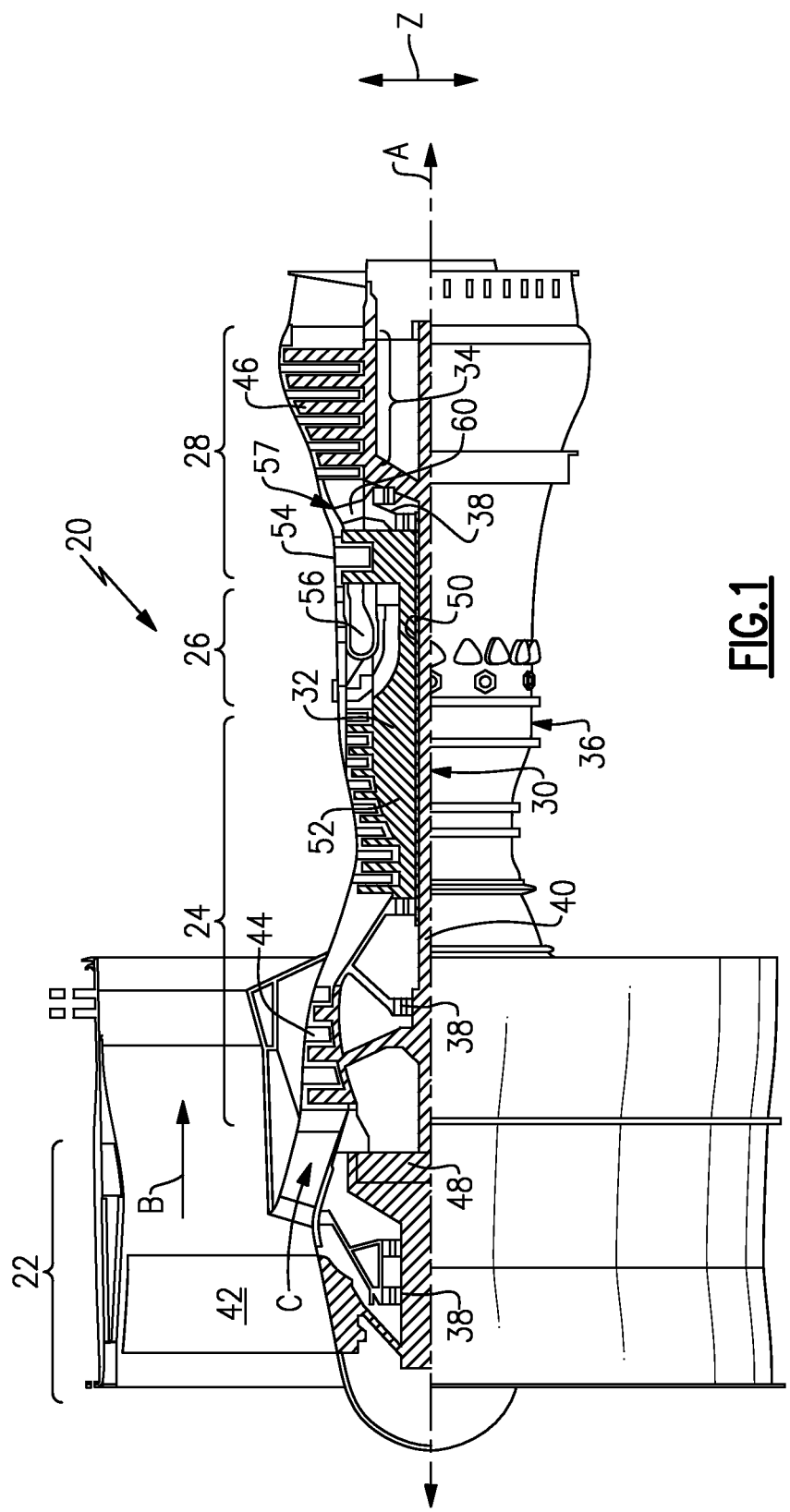
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core airflow C along a core flow path where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

Figure 2:
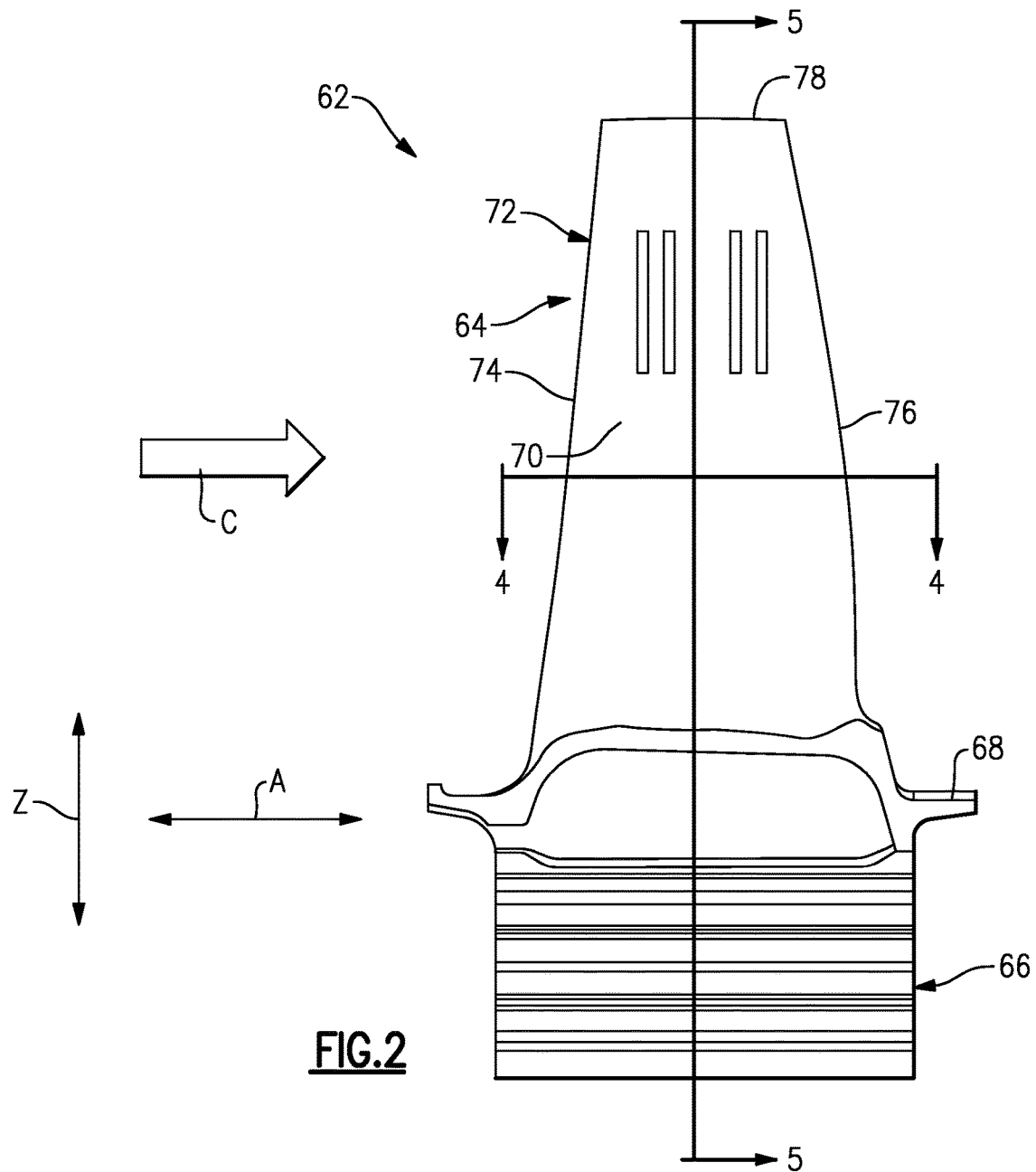
FIG. 2 is a side view of an engine component according to this disclosure.

FIG. 2 is a side view of an engine component 62 according to this disclosure. For exemplary purposes, the illustrated engine component 62 is a turbine blade. It should be understood that this disclosure extends to other engine components, such as compressor blades, stator vanes (e.g., FIGS. 8A-8B), and fan blades, as non-limiting examples.

The example engine component 62 includes an airfoil section 64, a root 66, and a platform 68. In this example, the root 66 includes a fir tree configuration. Other roots, such as dovetail roots, come within the scope of this disclosure, however.

The airfoil section 64 includes a pressure side wall 70 and a suction side wall 72, each of which extend between a leading edge 74 and a trailing edge 76. The pressure side wall 70 and the suction side wall 72 extend radially from the platform 68 to a radially outer blade tip 78. The term "radially," as used herein refers to the radial direction Z, which is normal to the engine central longitudinal axis A, and is used for purposes of explaining the relative location of the illustrated components without being otherwise limiting.

Figure 3:
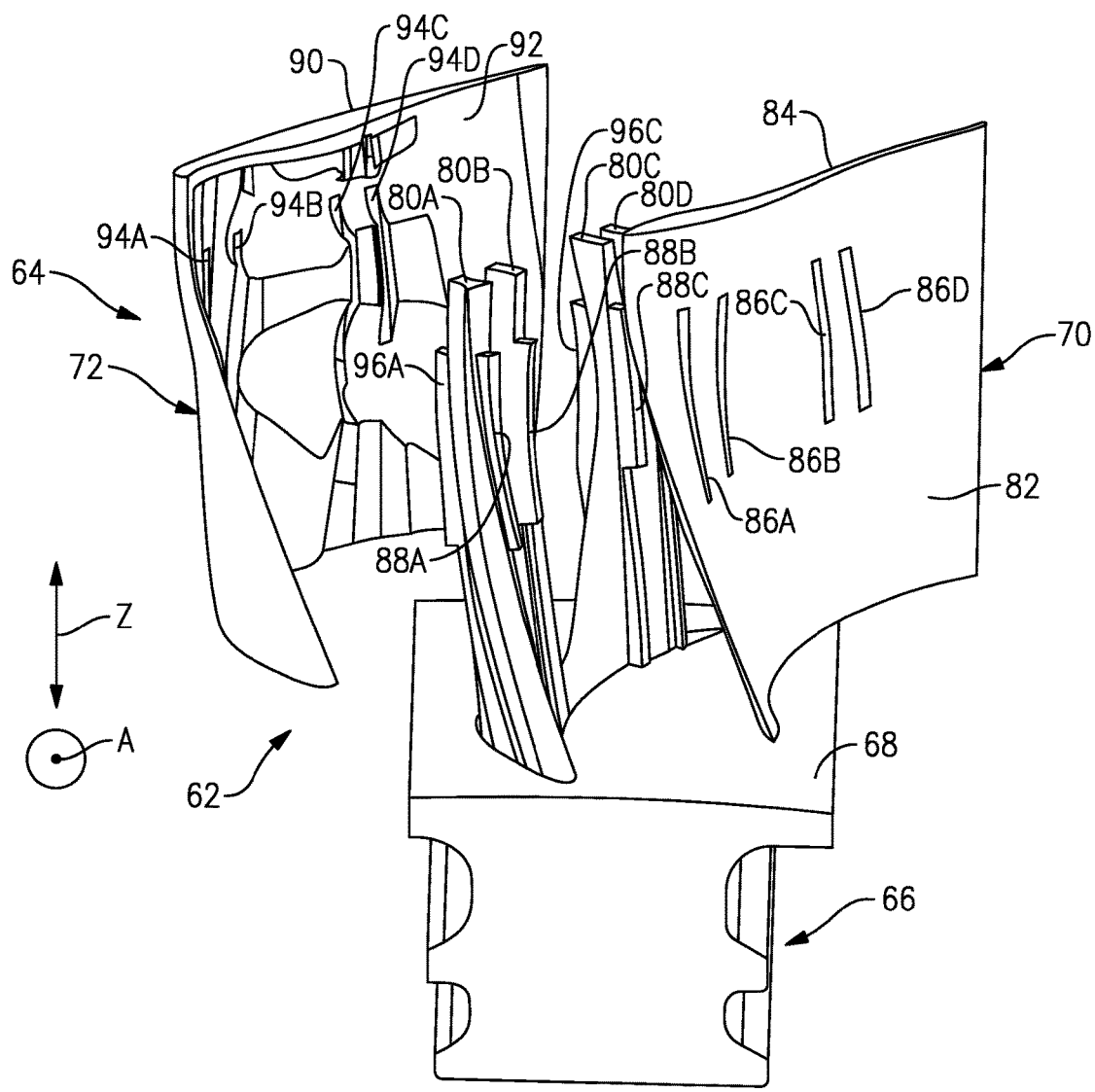
FIG. 3 is a perspective, exploded view of the engine component of FIG. 2.

In one example of this disclosure, the engine component 62 is a multiple piece engine component. For example, as illustrated in FIG. 3, the pressure side wall 70 and the suction side wall 72 can be formed separately from the root 66 and the platform 68 of the engine component 62. In other words, the exposed airfoil flowpath section 64 is a separate structure from the root 66 and platform 68.

In one example, the root 66, the platform 68, and a plurality of radial supports 80A-80D are integrally formed using a casting process, as explained in detail below relative to FIG. 6. In another example, a forging process is used. While in this example four radial supports 80A-80D are illustrated, it should be understood that there could be any number of radial supports.

The pressure side wall 70 and the suction side wall 72 are separately formed using an additive manufacturing process, again, as will be explained below relative to FIG. 6. After forming, the pressure side wall 70 and the suction side wall 72 are then joined to the radial supports 80A-80D to provide the airfoil section 64, as will be described in detail below.

Referring to FIG. 3, the pressure side wall 70 includes an outer surface 82 providing a portion of the outer contour of the airfoil section 64, and an inner surface 84 facing the radial supports 80A-80D. In one example, the pressure side wall 70 includes a plurality of radially extending slots 86A-86D.

In this example, the slots 86A-86D extend generally parallel to one another, and have a longitudinal dimension extending generally in the radial direction Z. The slots 86A-86D correspond to a plurality of pressure side ribs 88A-88D extending from the radial supports 80A-80D in a direction perpendicular to the radial direction Z.

The suction side wall 72 likewise includes an outer surface 90, an inner surface 92, and a plurality of slots 94A-94D which correspond to a plurality of suction side ribs 96A-96D extending from a suction side of the radial supports 80A-80D.

The slots 86A-86D, 94A-94D and ribs 88A-88D, 96A-96D facilitate alignment of the pressure side wall 70 and the suction side wall 72 relative to the radial supports 80A-80D, which may increase the ease of assembly of the engine component 62. Further, the adjacent surfaces of the slots 86A-86D, 94A-94D and ribs 88A-88D, 96A-96D (e.g., the surfaces that abut one another) provide joining interfaces for attachment (e.g., by welding). That is, the slots 86A-86D, 94A-94D and ribs 88A-88D, 96A-96D not only increase the ease of aligning the multiple pieces of the engine component 62, but also provide a joining interface for welding.

While the illustrated example includes slots 86A-86D, 94A-94D and ribs 88A-88D, 96A-96D, slots and ribs are not required in all embodiments. For instance, the radial supports 80A-80D may provide relatively planar mate faces corresponding to adjacent mate faces formed on the inner surfaces of the pressure side wall 70 and the suction side wall 72. These adjacent mate faces may provide joining interfaces for attaching the pressure and suction side walls 70, 72 to the radial supports 80A-80D.

Figure 4:
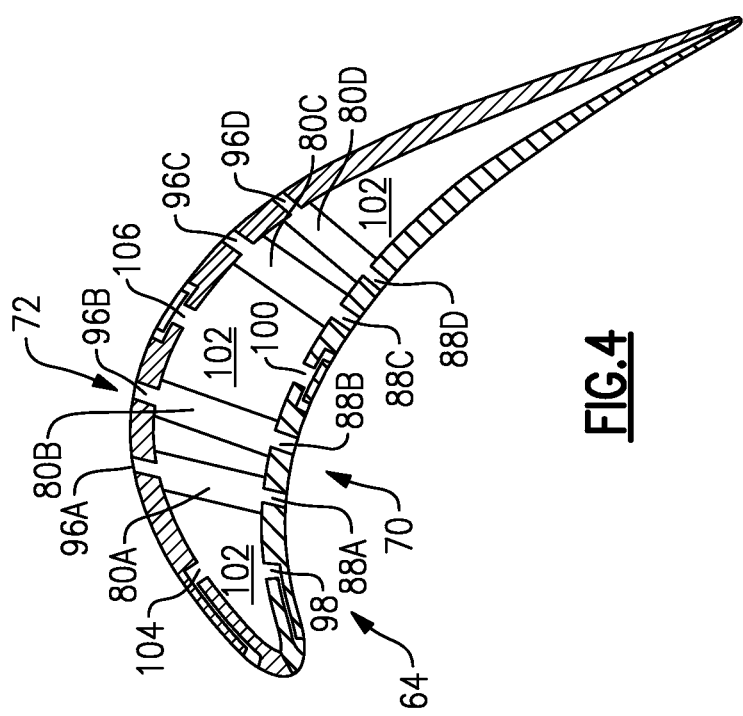
FIG. 4 is a sectional view of the engine component of FIG. 2, taken along line 4-4.

As illustrated in FIG. 4, the pressure side wall 70 can include a plurality of microchannels 98, 100 configured to direct a cooling flow of fluid from a core passageway 102 provided between the pressure and suction side walls 70, 72. The suction side wall 72 may likewise include a plurality of microchannels 104, 106 configured to direct a portion of fluid from the core passageway 102 outward toward the suction side wall. The illustrated microchannels 98, 100, 104, 106 are shown for illustrative purposes only. The pressure and suction side walls 70, 72 may include additional and/or different types of microchannels.

Figure 5:
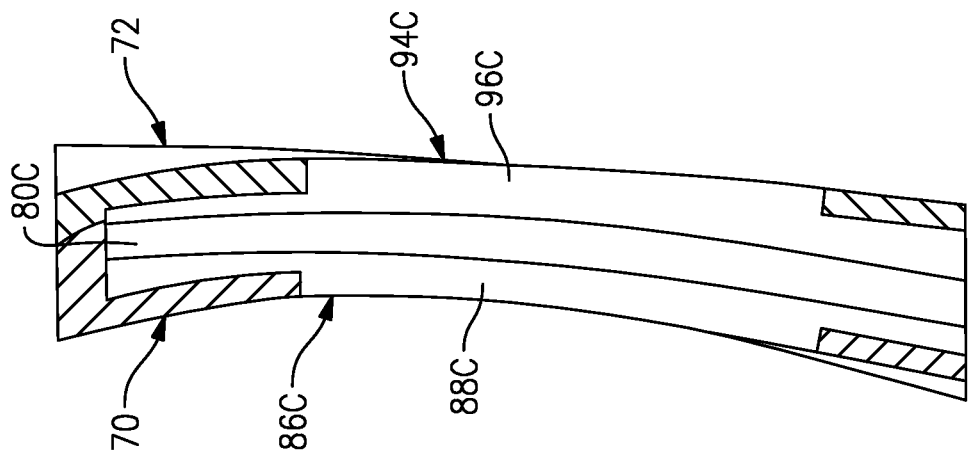
FIG. 5 is a sectional view of the engine component of FIG. 2, taken along line 5-5.

FIG. 5 is a view taken along line 5-5 from FIG. 2, and illustrates the detail of the interaction between the slots in the pressure and suction side walls 70, 72, and further illustrates the pressure and suction side walls 70, 72 joined to the radial supports 80A-80D. In one example, the pressure and suction side walls 70, 72 are welded (e.g., tack welded) to the radial supports 80A-80D. In other examples, the pressure and suction side walls 70, 72 are brazed, diffusion bonded, or glued/cemented to the radial supports 80A-80D. Other techniques for joining the pressure side wall and suction side wall 70, 72 to the radial supports 80A-80D may be used herein.

Figure 6:
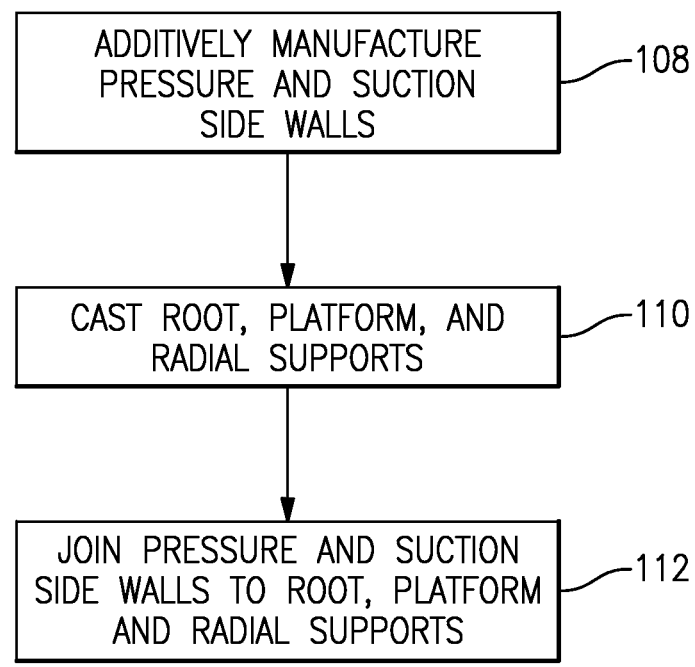
FIG. 6 schematically illustrates an example method according to this disclosure.
Figure 7:
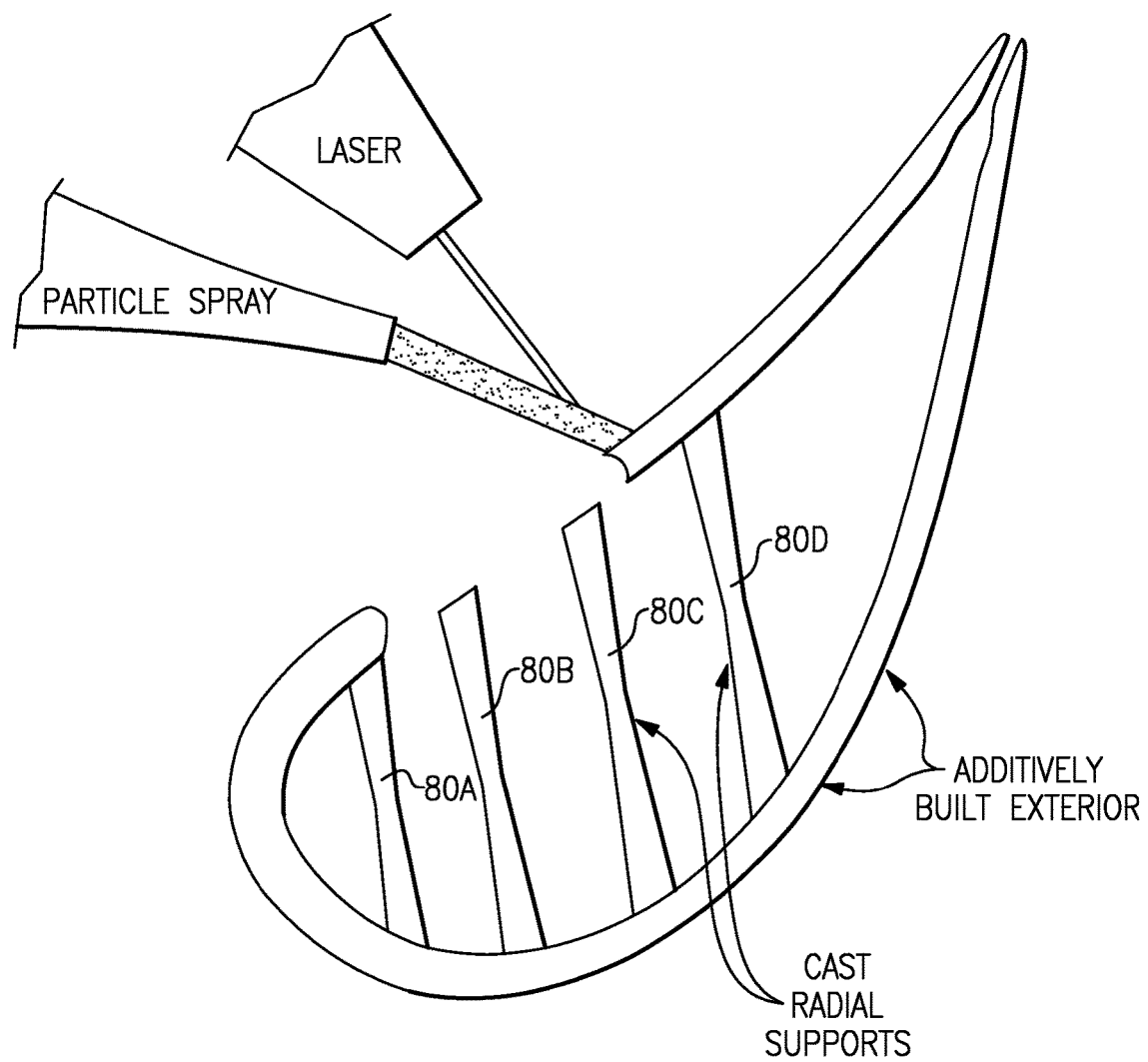
FIG. 7 schematically illustrates an example laser powder plasma spray (LPPS) process.

FIG. 6 illustrates an example method for forming the engine component 62. In the method, at 108, the pressure and suction side walls 70, 72 are additively manufactured. As is known of additive manufacturing processes, a powdered metal may be selectively melted to form a first layer of the component. In one example, the powdered metal is a titanium alloy. In another example, the powdered metal is a molybdenum alloy. Other example alloys may be used herein, such as: (1) a titanium, (2) tungsten, (3) nickel, (4) cobalt, and (5) steel alloys. As the selectively melted powder metal cools, additional powdered metal is layered on top of the cooled metal, and is selectively melted to form another, subsequent layer. The process is repeated to build the component. Example techniques include direct metal laser sintering (DMLS), electron beam melting (EBM), electron beam wire deposition (EBWD), and laser powder deposition (LPD). Other types of additive manufacturing processes come within the scope of this disclosure. For instance, as illustrated in FIG. 7, one example additive manufacturing process includes the use of a laser powder plasma spray (LPPS) process. In this process, the external flowpath surfaces 70, 72 are additively built, and leverage the cast (or forged) radial supports 80A-80D as the base for the additive build. In other words, the external flowpath surfaces 70, 72 are essentially built onto the radial supports 80A-80D.

Separately, the root 66, the platform 68, and the radial supports 80A-80D are formed, at 110, in one example by way of casting, such as investment casting. In another example, a forging process is used. In either case, the root 66, the platform 68, and the radial supports 80A-80D may be formed of a single crystal, directionally solidified, or equiax alloy. Such alloys are generally more resistant to creep than materials suited for additive manufacturing.

Finally, at 112, the pressure and suction side walls 70, 72 are joined to the casting formed at 110, by way of welding, or some other joining process, as mentioned above.

The microchannels 98, 100, 104, 106 in the pressure and suction side walls 70, 72 may be difficult to form by way of casting or forging. On the other hand, materials that are capable of being additively manufactured may be less resistant to creep and other stresses. Accordingly, this disclosure provides an engine component 62 with a first portion (e.g., the root, platform, and radial supports 80A-80D) having sufficient creep and other load-resistive capabilities, and second and third portions (the pressure and suction side walls 70, 72, for example) including relatively intricate microchannel cooling passageways for cooling the airfoil section 64.

While a molybdenum alloy is listed above as an example material for additive manufacturing, the pressure and suction side walls 70, 72 may be formed using different manufacturing techniques in the example when the pressure and suction side walls 70, 72 are made of a molybdenum alloy. For example, the pressure and suction side walls 70, 72 could be formed using EDM, ECM, or other, more conventional machining techniques. Further, if the pressure and suction side walls 70, 72 are made from a material that reacts with nickel (Ni) or has a different thermal expansion coefficient, then an intermediate material coating may be applied to the internal casting at locations of expected contact between the pressure and suction side walls and the internal casting.

Figures 8A, 8B:
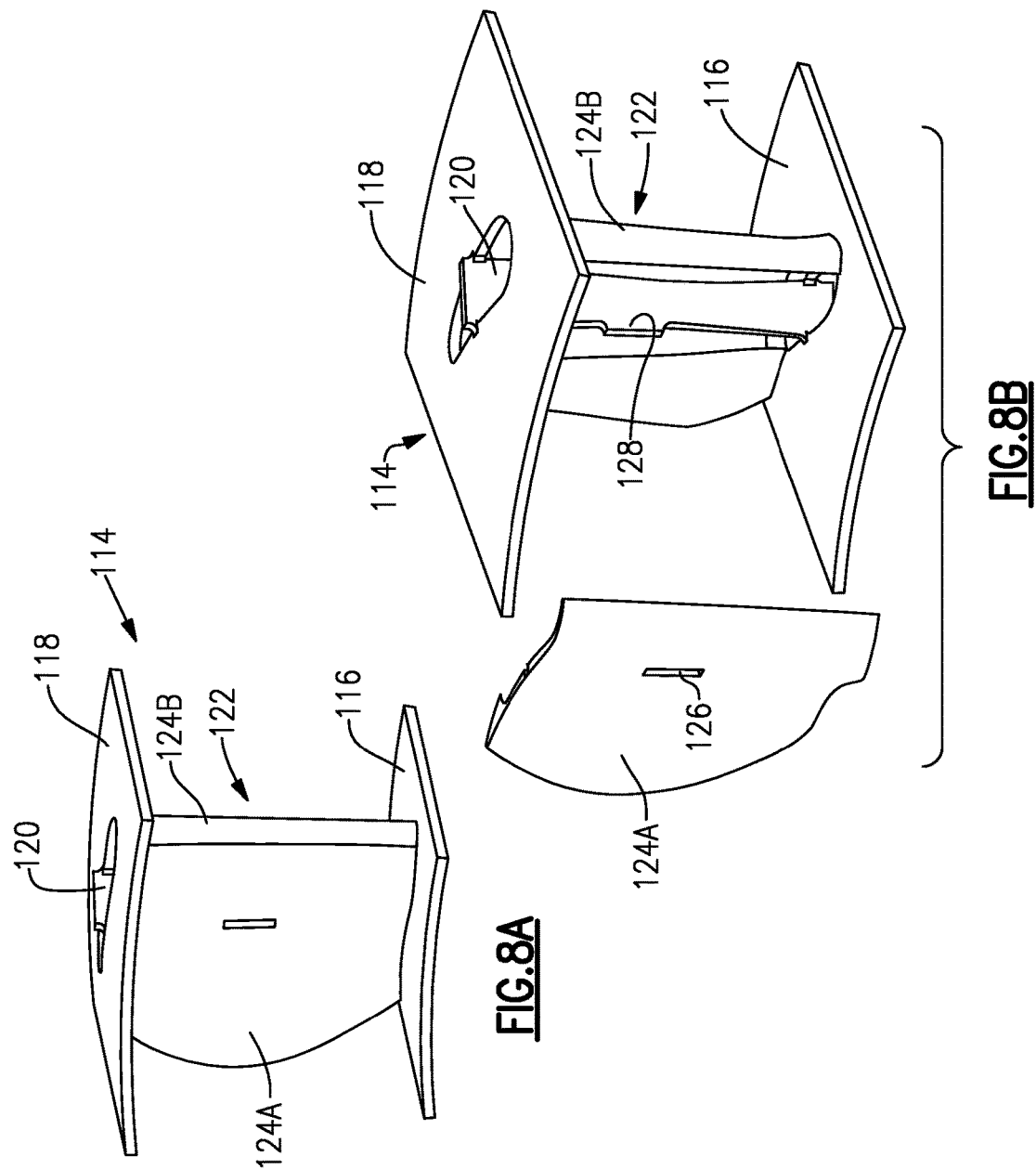
FIG. 8A illustrates another example engine component according to this disclosure.
FIG. 8B is an exploded view of the engine component of FIG. 8A.

While the above discussion is made relative to a rotor blade, this disclosure extends to stator vanes as well. As illustrated in FIGS. 8A-8B, an example stator vane 114 may include an inner platform 116, an outer platform 118, and a radial support 120 extending therebetween. In this example, the inner and outer platforms 116, 118 and the radial support 120 are formed using a casting or forging process. An airfoil section 122 of the vane 114 includes pressure and suction side sections 124A, 124B formed using an additive manufacturing process. Similar to the above example, the pressure and suction side sections 124A, 124B may include slots 126 for receiving a corresponding rib 128 from the radial support 120. In this example, the vane 114 only includes a single radial support 120, although it should be understood that additional radial supports could be included.

Although the different examples have the specific components shown in the illustrations, embodiments of this disclosure are not limited to those particular combinations.

It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method of forming a component of a gas turbine engine, comprising:
    forming a first portion of the component using one of a casting and a forging process, the first portion including a root, platform, and at least one radial support projecting from the platform;
    additively manufacturing a second portion of the component, the second portion providing a side wall of the component; and
    joining the second portion to the first portion;
    wherein the step of additively manufacturing the second portion includes directly additively building the second portion onto the first portion, wherein the at least one radial support of the first portion is used as a base for the additive build occurring during the step of additively manufacturing the second portion such that the step of joining the second portion to the first portion occurs concurrent with the step of additively manufacturing the second portion.

2. The method as recited in claim 1, including:
    additively manufacturing a third portion of the component; and
    joining the third portion to the first portion.

3. The method as recited in claim 1, wherein the additive manufacturing step includes one of a direct metal laser sintering (DMLS) process, an electron beam melting (EBM) process, electron beam wire deposition (EBWD) process, a laser powder deposition (LPD) process, and a laser powder plasma spray (LPPS) process.

4. The method as recited in claim 1, wherein the additive manufacturing step includes selectively melting a powdered metal, the powdered metal being one of (1) a titanium alloy, (2) tungsten alloy, (3) nickel alloy, (4) cobalt alloy, (5) steel alloy, and (6) a molybdenum alloy.

5. The method as recited in claim 2, wherein the second and third portions each include channels therein, the channels formed during the steps of additively manufacturing the second and third portions, respectively, and configured to direct a cooling flow of fluid from a core passageway of the component toward an exterior of the component.

6. The method as recited in claim 5, wherein the second portion is additively manufactured such that it includes a different quantity of channels than the third portion.

7. The method as recited in claim 5, wherein the second portion is additively manufactured such that it includes at least one different type of channel than the third portion.

8. The method as recited in claim 2, wherein the second portion and the third portion provide pressure and suction side walls of the component.

9. The method as recited in claim 8, wherein the at least one radial support includes at least one rib projecting into a corresponding slot formed in one of the second portion and the third portion.

10. The method as recited in claim 1, wherein the component is one of a rotor blade and a stator vane.

11. The method as recited in claim 1, wherein the root, platform, and at least one radial support are integrally formed of one of a single crystal, directionally solidified, and an equiax alloy.

12. A method of forming a component of a gas turbine engine, comprising
    forming a first portion of the component using one of a casting and a forging process, the first portion including a root, platform, and at least one radial support projecting from the platform;
    additively manufacturing a second portion of the component, the second portion providing a side wall of the component;
    joining the second portion to the first portion;
    additively manufacturing a third portion of the component; and
    joining the third portion to the first portion;
    wherein the second portion and the third portion provide pressure and suction side walls of the component,
    wherein the at least one radial support includes at least one rib projecting into a corresponding slot formed in one of the second portion and the third portion, and
    wherein the at least one radial support includes a plurality of radial supports, each of the radial supports including a first rib and a second rib projecting into slots formed in the second portion and the third portion.

13. The method as recited in claim 12, wherein the at least one radial support provides a mate face corresponding to a mate face of one of the second portion and the third portion.

* * * * *